United States Patent
Sakaida et al.

(10) Patent No.: US 11,784,345 B2
(45) Date of Patent: *Oct. 10, 2023

(54) SOLID ELECTROLYTE MATERIAL AND BATTERY

(71) Applicant: Panasonic Intellectual Property Management Co., Ltd., Osaka (JP)

(72) Inventors: Masashi Sakaida, Hyogo (JP); Tetsuya Asano, Nara (JP); Akihiro Sakai, Nara (JP); Yusuke Nishio, Osaka (JP); Akinobu Miyazaki, Osaka (JP); Shinya Hasegawa, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 224 days.

This patent is subject to a terminal disclaimer.

(21) Appl. No.: 16/914,335

(22) Filed: Jun. 27, 2020

(65) Prior Publication Data

US 2020/0328468 A1 Oct. 15, 2020

Related U.S. Application Data

(63) Continuation of application No. PCT/JP2018/041897, filed on Nov. 13, 2018.

(30) Foreign Application Priority Data

Jan. 5, 2018 (JP) ................................. 2018-000428

(51) Int. Cl.
*H01M 10/0562* (2010.01)
*C01F 17/36* (2020.01)
(Continued)

(52) U.S. Cl.
CPC ......... *H01M 10/0562* (2013.01); *H01M 4/13* (2013.01); *H01M 10/0525* (2013.01); *H01M 2004/027* (2013.01); *H01M 2004/028* (2013.01)

(58) Field of Classification Search
None
See application file for complete search history.

(56) References Cited

U.S. PATENT DOCUMENTS

| | | |
|---|---|---|
| 4,352,869 A | 10/1982 | Mellors |
| 5,506,073 A | 4/1996 | Angell et al. |

(Continued)

FOREIGN PATENT DOCUMENTS

| | | | |
|---|---|---|---|
| CN | 105254184 | 1/2016 | |
| CN | 105680048 | * 6/2016 | .......... H01M 4/1393 |

(Continued)

OTHER PUBLICATIONS

Bohnsack et al, Ternary Chlorides of the Rare-Earth Elements with Lithium, Li3MCl6 (M=Tb—Lu, Y, Sc): Synthesis, Crystal Structures, and Ionic Motion, 634 J. Inorg. Gen. Chem 1067-73 (Year: 1997).*

(Continued)

*Primary Examiner* — Yoshitoshi Takeuchi
(74) *Attorney, Agent, or Firm* — McDermott Will & Emery LLP

(57) ABSTRACT

Provided is a solid electrolyte material represented by a composition formula $Li_{3-3\delta}Y_{1+\delta-a}M_aCl_{6-x-y}Br_xI_y$, where M is at least one element selected from the group consisting of Al, Sc, Ga, and Bi; $-1<\delta<1$; $0<a<2$; $0<(1+\delta-a)$; $0\leq x\leq 6$; $0\leq y\leq 6$; and $(x+y)\leq 6$.

15 Claims, 4 Drawing Sheets

(51) Int. Cl.
H01M 4/13 (2010.01)
H01M 10/0525 (2010.01)
H01M 4/02 (2006.01)

(56) References Cited

U.S. PATENT DOCUMENTS

| | | | |
|---|---|---|---|
| 5,714,279 | A | 2/1998 | Zajac, Jr. et al. |
| 6,428,935 | B1 | 8/2002 | Takada et al. |
| 9,160,034 | B2 | 10/2015 | Kato et al. |
| 10,008,735 | B2 | 6/2018 | Ohtomo et al. |
| 2004/0151986 | A1 | 8/2004 | Park et al. |
| 2011/0045355 | A1 | 2/2011 | Ichikawa |
| 2011/0300444 | A1 | 12/2011 | Nakamura |
| 2012/0301796 | A1 | 11/2012 | Ohtomo et al. |
| 2012/0308900 | A1 | 12/2012 | Ogasa |
| 2013/0295464 | A1 | 11/2013 | Yanagi et al. |
| 2015/0147659 | A1 | 5/2015 | Kato |
| 2015/0229066 | A1 | 8/2015 | Wu et al. |
| 2016/0103232 | A1 | 4/2016 | Ouspenski et al. |
| 2016/0149259 | A1 | 5/2016 | Osada et al. |
| 2016/0156064 | A1 | 6/2016 | Miyashita et al. |
| 2016/0204467 | A1 | 7/2016 | Nogami et al. |
| 2016/0248119 | A1 | 8/2016 | Kato |
| 2016/0268630 | A1 | 9/2016 | Tsukada et al. |
| 2016/0285078 | A1 | 9/2016 | Deschamps et al. |
| 2016/0308210 | A1 | 10/2016 | Sakuda et al. |
| 2016/0359192 | A1 | 12/2016 | Homma et al. |
| 2016/0359193 | A1 | 12/2016 | Yi et al. |
| 2017/0040637 | A1 | 2/2017 | Ceder et al. |
| 2017/0179481 | A1 | 6/2017 | Yamada et al. |
| 2017/0187066 | A1 | 6/2017 | Tsujimura et al. |
| 2017/0222257 | A1 | 8/2017 | Miyashita et al. |
| 2017/0229734 | A1 | 8/2017 | Furukawa et al. |
| 2017/0288281 | A1 | 10/2017 | Chiang et al. |
| 2017/0309964 | A1 | 10/2017 | Iwamoto |
| 2018/0076452 | A1 | 3/2018 | Sasaki et al. |
| 2018/0183065 | A1 | 6/2018 | Sasaki |
| 2018/0269521 | A1 | 9/2018 | Ohtomo et al. |
| 2019/0067736 | A1 | 2/2019 | Yoshioka et al. |
| 2019/0088995 | A1 | 3/2019 | Asano et al. |
| 2019/0097266 | A1 | 3/2019 | Yamamoto et al. |
| 2020/0212481 | A1 | 7/2020 | Nagamine et al. |
| 2020/0328454 | A1 | 10/2020 | Sakai et al. |
| 2020/0328455 | A1 | 10/2020 | Sakai et al. |
| 2020/0328457 | A1 | 10/2020 | Sakai et al. |
| 2020/0328460 | A1 | 10/2020 | Asano et al. |
| 2020/0328461 | A1 | 10/2020 | Asano et al. |
| 2020/0328462 | A1 | 10/2020 | Asano et al. |
| 2020/0328464 | A1 | 10/2020 | Asano et al. |
| 2020/0328465 | A1 | 10/2020 | Sakaida et al. |
| 2020/0328469 | A1 | 10/2020 | Asano et al. |
| 2020/0335817 | A1 | 10/2020 | Asano et al. |
| 2020/0350615 | A1 | 11/2020 | Sakaida et al. |
| 2020/0350622 | A1 | 11/2020 | Sakaida et al. |

FOREIGN PATENT DOCUMENTS

| | | |
|---|---|---|
| CN | 108701860 A | 10/2018 |
| EP | 2916381 B1 | 6/2016 |
| EP | 3043411 A1 | 7/2016 |
| EP | 3428929 A1 | 1/2019 |
| EP | 3496202 A1 | 6/2019 |
| EP | 3736827 A1 | 11/2020 |
| EP | 3736829 A1 | 11/2020 |
| EP | 3736831 A1 | 11/2020 |
| EP | 3736834 A1 | 11/2020 |
| EP | 3736899 A1 | 11/2020 |
| EP | 3745422 A1 | 12/2020 |
| EP | 3745518 A1 | 12/2020 |
| EP | 3863028 A1 | 8/2021 |
| IN | 201847045950 A | 2/2019 |
| JP | S57-132677 A | 8/1982 |
| JP | H05-306117 A | 11/1993 |
| JP | H08-171938 A | 7/1996 |
| JP | H09-293516 A | 11/1997 |
| JP | 11-238528 A | 8/1999 |
| JP | 2001-052733 A | 2/2001 |
| JP | 2004-235155 | 8/2004 |
| JP | 2006-244734 A | 9/2006 |
| JP | 2008/021556 * | 1/2008 ............ H01M 10/05 |
| JP | 2008-060033 | 3/2008 |
| JP | 2008-234988 | 10/2008 |
| JP | 2011-129312 | 6/2011 |
| JP | 2011-253762 | 12/2011 |
| JP | 5076134 B2 | 11/2012 |
| JP | 2012-246196 A | 12/2012 |
| JP | 2013-073791 A | 4/2013 |
| JP | 2015-011901 A | 1/2015 |
| JP | 2015-032529 A | 2/2015 |
| JP | 2015-056349 A | 3/2015 |
| JP | 2016-024874 | 2/2016 |
| JP | 2016-171067 A | 9/2016 |
| JP | 2017-059342 A | 3/2017 |
| JP | 2017-091953 A | 5/2017 |
| JP | 2017-091955 A | 5/2017 |
| JP | 2017-111954 | 6/2017 |
| JP | 2017-117753 A | 6/2017 |
| JP | 2017-518622 A | 7/2017 |
| JP | 2017-152324 A | 8/2017 |
| JP | 2017-199668 | 11/2017 |
| JP | 6222134 B2 | 11/2017 |
| JP | 2017-224474 A | 12/2017 |
| WO | 2000/028608 | 5/2000 |
| WO | 2011/073798 A2 | 6/2011 |
| WO | 2015/011937 A1 | 1/2015 |
| WO | 2015/030052 A1 | 3/2015 |
| WO | 2015/049986 A1 | 4/2015 |
| WO | 2015/136623 | 9/2015 |
| WO | 2017/047015 | 3/2017 |
| WO | 2017/108105 | 6/2017 |
| WO | 2017/154766 A1 | 9/2017 |
| WO | 2017/154922 | 9/2017 |
| WO | 2018/025582 | 2/2018 |
| WO | 2019/146218 A1 | 8/2019 |
| WO | 2019/146219 A1 | 8/2019 |

OTHER PUBLICATIONS

Bohnsack et al, The Bromides of Li3MBr6 (M=Tb—Lu, Y, Sc): Synthesis, Crystal Structures, and Ionic Motion, 623 J. Inorg. Gen. Chem 1352-56 (Year: 1997).*
English translation of JP 2008/021556 (Year: 2008).*
English translation of CN 105680048 (Year: 2016).*
English Translation of Chinese Search Report dated Jul. 6, 2021 for the related Chinese Patent Application No. 201880071236.0.
English Translation of Chinese Search Report dated Jul. 30, 2021 for the related Chinese Patent Application No. 201880071076.X.
English Translation of Chinese Search Report dated Aug. 2, 2021 for the related Chinese Patent Application No. 201880070620.9.
International Search Report of PCT application No. PCT/JP2018/041897 dated Feb. 19, 2019.
Andreas Bohnsack et al., "The bromides Li3MBr6 (M=Sm—Lu,Y): Synthesis, Crystal Structure, and Ionic Mobility", Journal of Inorganic and General Chemistry, Sep. 1997, vol. 623/Issue 9, pp. 1352-1356.
Andreas Bohnsack et al., "Ternary Chlorides of the Rare-Earth Elements with Lithium, Li3MCl6 (M=Tb—Lu, Y, Sc) Synthesis, Crystal Structures, and Ionic Motion", Journal of Inorganic and General Chemistry, Jul. 1997, vol. 623/Issue 7, pp. 1067-1073.
International Search Report of International Application No. PCT/JP2018/043363 dated Feb. 19, 2019.
International Search Report of International Application No. PCT/JP2018/041893 dated Feb. 19, 2019.
International Search Report of International Application No. PCT/JP2018/041892 dated Feb. 19, 2019.
International Search Report of International Application No. PCT/JP2018/041894 dated Feb. 19, 2019.
International Search Report of International Application No. PCT/JP2018/046258 dated Feb. 5, 2019.

(56) References Cited

OTHER PUBLICATIONS

International Search Report of International Application No. PCT/JP2018/046259 dated Mar. 12, 2019.
International Search Report of International Application No. PCT/JP2018/046260 dated Mar. 12, 2019.
International Search Report of International Application No. PCT/JP2018/046262 dated Mar. 19, 2019.
International Search Report of International Application No. PCT/JP2018/041900 dated Feb. 19, 2019.
International Search Report of International Application No. PCT/JP2018/046263 dated Mar. 19, 2019.
International Search Report of International Application No. PCT/JP2018/046264 dated Mar. 19, 2019.
International Search Report of International Application No. PCT/JP2018/042061 dated Feb. 19, 2019.
International Search Report of International Application No. PCT/JP2018/042062 dated Feb. 19, 2019.
Yasumasa Tomita et al., "Lithium ion conductivity of Li3InBr6 doped with different element", Denka Chemical Society 70th Anniversary Conference Abstracts, Mar. 25, 2003, p. 384; with English translation.
Yasumasa Tomita et al., "Preparation of Substituted Compounds of Lithium Indium Bromide and Fabrication of All Solid-State battery", Recent Innovations in Chemical Engineering, 2017, 10, 12-17.
The Extended European Search Report dated Jan. 29, 2021 for the related European Patent Application No. 18898666.5.
The Extended European Search Report dated Feb. 5, 2021 for the related European Patent Application No. 18898795.2.
The Extended European Search Report dated Feb. 9, 2021 for the related European Patent Application No. 18898242.5.
The Extended European Search Report dated Feb. 9, 2021 for the related European Patent Application No. 18898043.7.
The Extended European Search Report dated Feb. 9, 2021 for the related European Patent Application No. 18898663.2.
The Extended European Search Report dated Feb. 9, 2021 for the related European Patent Application No. 18898873.7.
The Extended European Search Report dated Feb. 9, 2021 for the related European Patent Application No. 18898935.4.
The Extended European Search Report dated Feb. 9, 2021 for the related European Patent Application No. 18902720.4.
The Extended European Search Report dated Feb. 9, 2021 for the related European Patent Application No. 18898525.3.
The Extended European Search Report dated Feb. 10, 2021 for the related European Patent Application No. 18898462.9.
The Extended European Search Report dated Feb. 15, 2021 for the related European Patent Application No. 18898524.6.
Lutz H D et al: "Ionic motion of tetrahedrally and octahedrally coordinated lithium ions in ternary and quaternary halides", Solid State Ionics, North Holland Pub. Company. Amsterdam; NL, NL, vol. 28-30, Sep. 1, 1988?(Sep. 1, 1988), pp. 1282-1286, XP024682689.
Tetsuya Asano; Akihiro Sakai; Satoru Ouchi; Masashi Sakaida; Akinobu Miyazaki; Shinya Hasegawa: "Solid Halide Electrolytes with High Lithium-Ion Conductivity for Application in 4 V Class Bulk-Type All-Solid-State Batteries", Advanced Materials, vol. 30, No. 44, Sep. 14, 2018?(Sep. 14, 2018), p. 1803075, XP055721991.
Indian Examination Report dated Mar. 28, 2022 for the related Indian Patent Application No. 202047027797.
Indian Examination Report dated Apr. 4, 2022 for the related Indian Patent Application No. 202047027476.
Indian Examination Report dated Apr. 29, 2022 for the related Indian Patent Application No. 202047027475.
Indian Examination Report dated May 25, 2022 for the related Indian Patent Application No. 202047027723.
Indian Examination Report dated Jun. 13, 2022 for the related Indian Patent Application No. 202047027726.
Indian Examination Report dated Jun. 14, 2022 for the related Indian Patent Application No. 202047027488.
Tomita, Y. et al., "Substitution effect of ionic conductivity in lithium ion conductor, Li3InBr6-xClx.," Solid State Ionics 179.21-26 (2008): 867-870. (Year: 2008).
Steiner, H-J., and H. D. Lutz, "Neue schnelle Ionenleiter vom Typ MI3 MIIICI6 (MI=Li, Na, Ag; MIII=In, Y)." Zeitschrift fur anorganhische und allgemeine Chemie 613.7 (1992): 26-30 (Year: 1992).
Tomita, Yasumasa et al. "Substitution effect in the ion conductor Li3InBr6, studied by nuclear magnetic resonance." Zeitschrift fur Naturforschung A 57.6-7 (2002): 447-450 (Year: 2002).
Tomita, Yasumasa et al. "Synthesis of Li3+ xIn1-xMxBr6 (M=Zn, Co, Fe) by Nano-grinding and their Ionic Conductivity." Transactions of the Materials Research Society of Japan 33.4 (2008): 973-976 (Year: 2008).
G. J. Kipouros et al. Reversible Electrode Potentials for Formation of Solid and Liquid Chlorozirconate and Chlorohafnate Compounds (Year: 1992).
Indian Examination Report dated Jun. 21, 2022 for the related Indian Patent Application No. 202047027487.
International Search Report of PCT application No. PCT/JP2018/045584 dated Mar. 19, 2019.
Extended European Search Report dated Feb. 11, 2021 for the related European Patent Application No. 18902871.5.
International Search Report of PCT application No. PCT/JP2018/045588 dated Mar. 19, 2019.
The Extended European Search Report dated Feb. 10, 2021 for the related European Patent Application No. 18902731.1.
International Search Report of PCT application No. PCT/JP2018/042060 dated Jan. 29, 2019.
William D. Richards et al., "Interface Stability in Solid-State Batteries", Chemistry of Materials, 2016, vol. 28, Dec. 7, 2015, pp. 266-273.
The Extended European Search Report dated Feb. 17, 2021 for the related European Patent Application No. 18902279.1.
International Search Report of PCT application No. PCT/JP2019/040062 dated Dec. 24, 2019.
Fudong Han et al., "A Battery Made from a Single Material", Advanced Materials, 27 (2015), pp. 3473-3483.
International Search Report of PCT application No. PCT/JP2019/040063 dated Dec. 24, 2019.
The Extended European Search Report dated Dec. 20, 2021 for the related European Patent Application No. 19891097.8.
English Translation of Chinese Search Report dated Mar. 11, 2023 for the related Chinese Patent Application No. 201880071935.5.
Yasumasa Tomita et al. "Synthesis and Characterization of Lithium Ion Conductors, Li3InBr6 and their Substituted Compounds", <Diffusion and Defect Data—Solid State Data, Pt. A: Defect and Diffusion Forum>, vol. 242-244, pp. 17-26.
Yasumasa Tomita et al., "Li ion conductivity of solid electrolyte, Li3-2xMxInBr6 (M=Mg, Ca, Sr, Ba)", Solid State Ionics 174.1-4 (2004): 35-39 (Year: 2004).

* cited by examiner

SOLID ELECTROLYTE MATERIAL AND BATTERY

BACKGROUND

1. Technical Field

The present disclosure relates to a solid electrolyte material and a battery.

2. Description of the Related Art

Patent Literature 1 discloses an all-solid battery using a sulfide solid electrolyte.
Non-Patent Literature 1 discloses $Li_3YCl_6$.
Non-Patent Literature 2 discloses $Li_3YBr_6$.

CITATION LIST

Patent Literature

Patent Literature 1: Japanese Patent Application Publication No. 2011-129312

Non-Patent Literature

Non-patent Literature 1: Z. Anorg. Allg. Chem. 623(1997), 1067-1073.
Non-patent Literature 2: Z. Anorg. Allg. Chem. 623(1997), 1352-1356.

SUMMARY

In the prior art, realization of a solid electrolyte material having high lithium ion conductivity is desired.

The solid electrolyte material in one aspect of the present disclosure is represented by a composition formula $Li_{3-3\delta}Y_{1+\delta-a}M_aCl_{6-x-y}Br_xI_y$,
where
M is at least one element selected from the group consisting of Al, Sc, Ga, and Bi;
$-1<\delta<1$;
$<a<2$;
$0<(1+\delta-a)$;
$0 \leq x \leq 6$;
$0 \leq y \leq 6$; and
$(x+y) \leq 6$.

According to the present disclosure, a solid electrolyte material having high lithium ion conductivity can be realized.

DETAILED DESCRIPTION OF THE EMBODIMENTS

Figure 1:
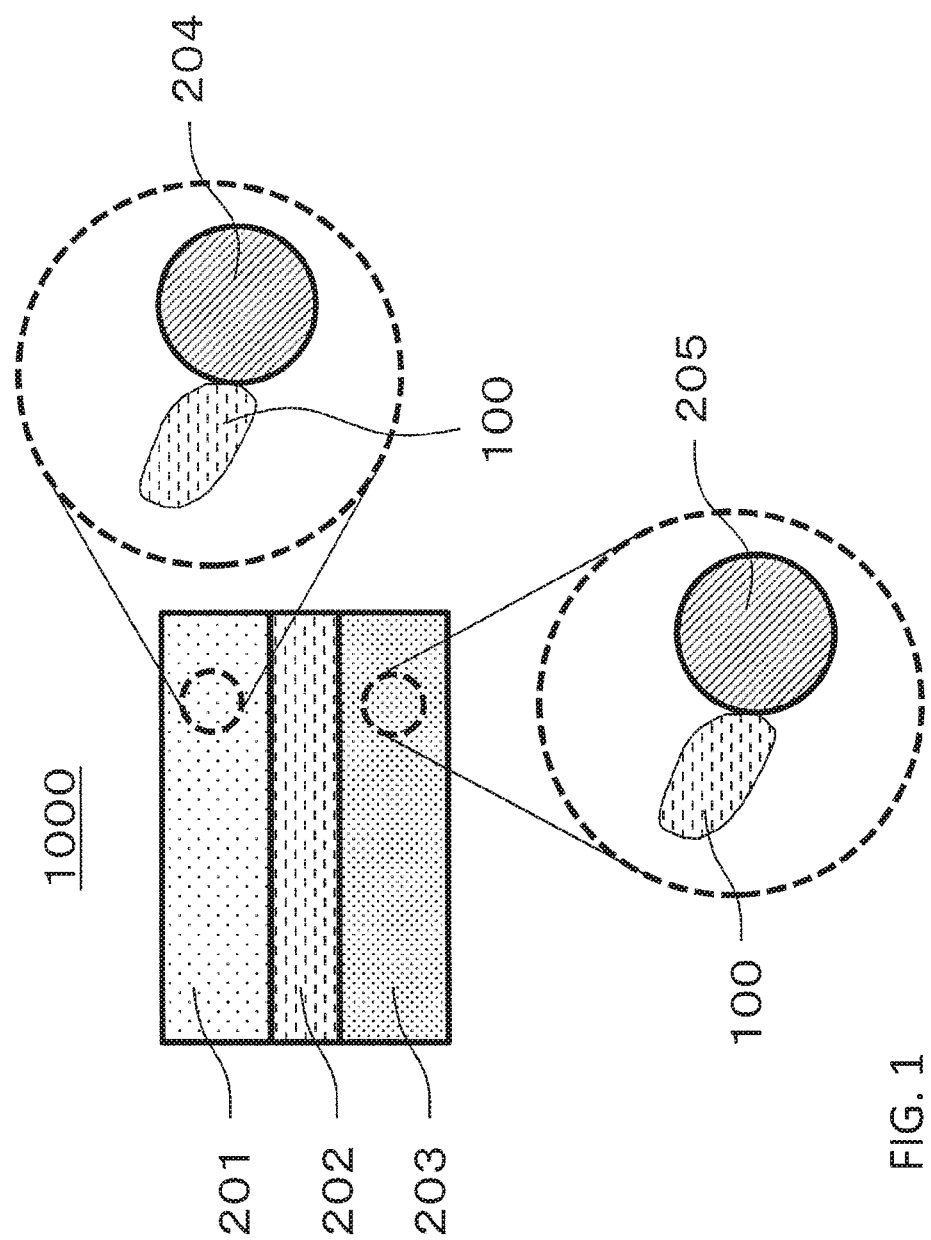
FIG. 1 is a cross-sectional view showing a schematic configuration of a battery 1000 in a second embodiment.

Hereinafter, embodiments of the present disclosure will be described with reference to the drawings.

First Embodiment

The solid electrolyte material in the first embodiment is a solid electrolyte material represented by the following composition formula (1):

$$Li_{3-3\delta}Y_{1+\delta-a}M_aCl_{6-x-y}Br_xI_y \quad \text{Formula (1)}$$

where M is one or more kinds of elements selected from the group consisting of Al, Sc, Ga, and Bi.
Further,
$-1<\delta<1$;
$0<a<2$;
$0<(1+\delta-a)$;
$0 \leq x \leq 6$;
$0 \leq y \leq 6$; and
$(x+y) \leq 6$ are satisfied.

According to the above configuration, a solid electrolyte material (halide solid electrolyte material) having high lithium ion conductivity can be realized.

In addition, according to the above configuration, an all-solid secondary battery excellent in a charge/discharge characteristic can be realized by using the solid electrolyte material of the first embodiment. In addition, by using the solid electrolyte material of the first embodiment, an all-solid secondary battery which does not including sulfur can be realized. In other words, the solid electrolyte material of the first embodiment does not have a configuration (for example, the configuration of Patent Literature 1) in which hydrogen sulfide is generated when exposed to the atmosphere. For this reason, an all-solid secondary battery which does not generate hydrogen sulfide and is excellent in safety can be realized.

In addition, the solid electrolyte material in the first embodiment may satisfy $0.025 \leq a \leq 0.99$ in the above composition formula (1).

According to the above configuration, a solid electrolyte material having higher lithium ion conductivity can be realized.

In addition, the solid electrolyte material in the first embodiment may satisfy $0.035 \leq a \leq 0.1$ in the above composition formula (1).

According to the above configuration, a solid electrolyte material having higher lithium ion conductivity can be realized.

The solid electrolyte material in the first embodiment may satisfy $-0.5 \leq \delta \leq 0.5$ in the above composition formula (1).

According to the above configuration, a solid electrolyte material having higher lithium ion conductivity can be realized.

The solid electrolyte material in the first embodiment may satisfy $-0.3 \leq \delta \leq 0.2$ in the above composition formula (1).

According to the above configuration, a solid electrolyte material having higher lithium ion conductivity can be realized.

The solid electrolyte material in the first embodiment may be crystalline or amorphous.

In addition, a shape of the solid electrolyte material in the first embodiment is not specifically limited, for example, an acicular shape, a spherical shape, or an elliptical spherical shape. For example, the solid electrolyte material in the first embodiment may be particles. After a plurality of the particles are stacked, the plurality of the particles may be formed into a pellet shape or a plate shape by pressurization.

For example, if the shape of the solid electrolyte material in the first embodiment is particulate (for example, spherical), the median diameter thereof may be not less than 0.1 μm and not more than 100 μm.

In the first embodiment, the median diameter may be not less than 0.5 µm and not more than 10 µm.

According to the above configuration, ion conductivity can be further improved. In addition, a better dispersion state of the solid electrolyte material and the active material in the first embodiment can be formed.

In the first embodiment, the solid electrolyte material may be smaller than the median diameter of the active material.

According to the above configuration, a better dispersion state of the solid electrolyte material and the active material in the first embodiment can be formed.

<Manufacturing Method of Solid Electrolyte Material>

The solid electrolyte material in the first embodiment may be manufactured by the following method, for example.

Binary halide raw material powders are prepared so as to provide a blending ratio of a target composition. For example, if $Li_3Y_{0.95}Bi_{0.05}Cl_6$ is produced, LiCl, $YCl_3$, and $BiCl_3$ are prepared at a molar ratio of approximately 3:0.95:0.05. In consideration of change in composition during synthesis process, the blending ratio may be adjusted in advance so as to cancel the change. The above-described values "δ", "a", "x", and "y" can be adjusted by adjusting the raw material, the blending ratio, and the synthesis process.

After the raw material powders are mixed well, the raw material powders are mixed and ground to react by a mechanochemical milling method. Subsequently, the powders may be sintered in a vacuum or an inert atmosphere.

Alternatively, the raw material powders may be mixed well and then sintered in a vacuum or in an inert atmosphere. For example, it is preferable that the powders are sintered within a range of 100° C. to 650° C. for 1 hour or longer.

Thereby, the solid electrolyte material including the composition as described above is provided.

Second Embodiment

Hereinafter, the second embodiment will be described. The description which has been set forth in the first embodiment is omitted as appropriate.

The battery in the second embodiment is configured using the solid electrolyte material described in the first embodiment.

The battery in the second embodiment comprises a solid electrolyte material, a positive electrode, a negative electrode, and an electrolyte layer.

The electrolyte layer is a layer provided between the positive electrode and the negative electrode.

At least one of the positive electrode, the electrolyte layer, and the negative electrode includes the solid electrolyte material in the first embodiment.

According to the above configuration, the charge/discharge characteristic of the battery can be improved.

A specific example of the battery in the second embodiment will be described below.

FIG. 1 is a cross-sectional view showing a schematic configuration of a battery 1000 in the second embodiment.

The battery 1000 in the second embodiment comprises a positive electrode 201, a negative electrode 203, and an electrolyte layer 202.

The positive electrode 201 includes positive electrode active material particles 204 and solid electrolyte particles 100.

The electrolyte layer 202 is disposed between the positive electrode 201 and the negative electrode 203.

The electrolyte layer 202 includes an electrolyte material (for example, a solid electrolyte material).

The negative electrode 203 includes negative electrode active material particles 205 and solid electrolyte particles 100.

Each of the solid electrolyte particles 100 is a particle formed of the solid electrolyte material in the first embodiment or a particle including the solid electrolyte material in the first embodiment as a main component.

The positive electrode 201 includes a material having a property of storing and releasing metal ions (for example, lithium ions). The positive electrode 201 includes, for example, a positive electrode active material (for example, the positive electrode active material particles 204).

Examples of the positive electrode active material include lithium-containing transition metal oxides (e.g., Li(NiCoAl)$O_2$ or $LiCoO_2$), transition metal fluorides, polyanions, fluorinated polyanion materials, transition metal sulfides, transition metal oxyfluorides, transition metal oxysulfides, and transition metal oxynitrides.

The median diameter of the positive electrode active material particles 204 may be not less than 0.1 µm and not more than 100 µm. If the median diameter of the positive electrode active material particles 204 is less than 0.1 µm, there is a possibility that the positive electrode active material particles 204 and the halide solid electrolyte material cannot form a good dispersion state in the positive electrode. As a result, the charge/discharge characteristic of the battery is lowered. In addition, if the median diameter of the positive electrode active material particles 204 is more than 100 µm, lithium diffusion in the positive electrode active material particles 204 is made slow. As a result, it may be difficult to operate the battery at a high output.

The median diameter of the positive electrode active material particles 204 may be larger than the median diameter of the halide solid electrolyte material. Thereby, the good dispersion state of the positive electrode active material particles 204 and the halide solid electrolyte material can be formed.

With regard to the volume ratio "v:100-v" between the positive electrode active material particles 204 and the halide solid electrolyte material included in the positive electrode 201, 30≤v≤95 may be satisfied. If v<30, it may be difficult to ensure an energy density of the battery sufficiently. In addition, if v>95, it may be difficult to operate at high output.

The thickness of the positive electrode 201 may be not less than 10 µm and not more than 500 µm. If the thickness of the positive electrode is less than 10 µm, it may be difficult to ensure an energy density of the battery sufficiently. In addition, if the thickness of the positive electrode is more than 500 µm, it may be difficult to operate at a high output.

The electrolyte layer 202 is a layer including an electrolyte material. The electrolyte material is, for example, a solid electrolyte material. In other words, the electrolyte layer 202 may be a solid electrolyte layer.

The solid electrolyte layer may include the solid electrolyte material in the first embodiment as a main component. In other words, the solid electrolyte layer may include the solid electrolyte material in the first embodiment, for example, at a weight ratio of not less than 50% (not less than 50% by weight) with respect to the entire solid electrolyte layer.

According to the above configuration, the charge/discharge characteristic of the battery can be further improved.

In addition, the solid electrolyte layer may include the solid electrolyte material in the first embodiment, for example, at a weight ratio of not less than 70% (not less than 70% by weight) with respect to the entire solid electrolyte layer.

According to the above configuration, the charge/discharge characteristic of the battery can be further improved.

The solid electrolyte layer, which may include the solid electrolyte material in the first embodiment as a main component, may further include inevitable impurities. The solid electrolyte layer may include the starting materials used for the synthesis of the solid electrolyte material. The solid electrolyte layer may include by-products or decomposition products generated when the solid electrolyte material is synthesized.

In addition, the solid electrolyte layer may include the solid electrolyte material in the first embodiment, for example, at a weight ratio of 100% (100% by weight) to the entire solid electrolyte layer, except for the inevitable impurities.

According to the above configuration, the charge/discharge characteristic of the battery can be further improved.

As described above, the solid electrolyte layer may be composed only of the solid electrolyte material in the first embodiment.

Alternatively, the solid electrolyte layer may be composed only of a solid electrolyte material different from the solid electrolyte material in the first embodiment. As the solid electrolyte material different from the solid electrolyte material in the first embodiment, for example, $Li_2MgX_4$, $Li_2FeX_4$, $Li(Al, Ga, In)X_4$, $Li_3(Al, Ga, In)X_6$, or $LiI(X: Cl, Br, I)$ may be used.

The solid electrolyte layer may include simultaneously the solid electrolyte material in the first embodiment and the solid electrolyte material different from the solid electrolyte material in the first embodiment. At this time, both of them may be dispersed uniformly. The layer formed of the solid electrolyte material in the first embodiment and the layer formed of the solid electrolyte material different from the solid electrolyte material in the first embodiment may be sequentially arranged in the stacking direction of the battery.

The thickness of the solid electrolyte layer may be not less than 1 μm and not more than 1,000 μm. If the thickness of the solid electrolyte layer is less than 1 μm, the possibility that the positive electrode 201 and the negative electrode 203 are short-circuited increases. In addition, if the thickness of the solid electrolyte layer is more than 1,000 μm, it may be difficult to operate at a high output.

The negative electrode 203 includes a material having a property of storing and releasing metal ions (for example, lithium ions). The negative electrode 203 includes, for example, a negative electrode active material (for example, the negative electrode active material particles 205).

As the negative electrode active material, a metal material, a carbon material, an oxide, a nitride, a tin compound, or a silicon compound may be used. The metal material may be a single metal. Alternatively, the metal material may be an alloy. Examples of the metal material include a lithium metal and a lithium alloy. Examples of the carbon material include natural graphite, coke, graphitized carbon, carbon fiber, spherical carbon, artificial graphite, and amorphous carbon. From the viewpoint of capacity density, silicon (Si), tin (Sn), a silicon compound, or a tin compound may be preferably used. If a negative electrode active material having a low average reaction voltage is used, the effect of suppressing electrolysis by the solid electrolyte material in the first embodiment is better exhibited.

The median diameter of the negative electrode active material particles 205 may be not less than 0.1 μm and not more than 100 μm. If the median diameter of the negative electrode active material particles 205 is less than 0.1 μm, there is a possibility that the negative electrode active material particles 205 and the solid electrolyte particles 100 cannot form a good dispersion state in the negative electrode. Thereby, the charge/discharge characteristic of a battery is lowered. On the other hand, if the median diameter of the negative electrode active material particles 205 is more than 100 μm, lithium diffusion in the negative electrode active material particles 205 is made slow. As a result, it may be difficult to operate the battery at a high output.

The median diameter of the negative electrode active material particles 205 may be larger than the median diameter of the solid electrolyte particles 100. Thereby, the good dispersion state of the negative electrode active material particles 205 and the halide solid electrolyte material can be formed.

With regard to the volume ratio "v:100-v" of the negative electrode active material particles 205 and the solid electrolyte particles 100 included in the negative electrode 203, $30 \leq v \leq 95$ may be satisfied. If $v<30$, it may be difficult to ensure an energy density of the battery sufficiently. In addition, if $v>95$, it may be difficult to operate at high output.

The thickness of the negative electrode 203 may be not less than 10 μm and not more than 500 μm. If the thickness of the negative electrode is less than 10 μm, it may be difficult to ensure an energy density of the battery sufficiently. In addition, if the thickness of the negative electrode is more than 500 μm, it may be difficult to operate at a high output.

At least one of the positive electrode 201, the electrolyte layer 202, and the negative electrode 203 may include a sulfide solid electrolyte or an oxide solid electrolyte for the purpose of improving ion conductivity, chemical stability, or electrochemical stability. As the sulfide solid electrolyte, $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, or $Li_{10}GeP_2S_{12}$ may be used. As the oxide solid electrolyte, a NASICON solid electrolyte such as $LiTi_2(PO_4)_3$ and its element substitution products, a (LaLi)$TiO_3$ perovskite solid electrolyte, a LISICON solid electrolyte such as $Li_{14}ZnGe_4O_{16}$, $Li_4SiO_4$, $LiGeO_4$ and its element substitution products, a garnet solid electrolyte such as $Li_7La_3Zr_2O_{12}$ and its element substitution products, $Li_3N$ and its H substitution products, and $Li_3PO_4$ and its N substitution products may be used.

At least one of the positive electrode 201, the electrolyte layer 202, and the negative electrode 203 may include an organic polymer solid electrolyte for the purpose of increasing ion conductivity. As the organic polymer solid electrolyte, for example, a compound of a polymer compound and a lithium salt can be used. The polymer compound may have an ethylene oxide structure. Due to the ethylene oxide structure, a large amount of lithium salt can be included to further increase the ion conductivity. As the lithium salt, $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, or $LiC(SO_2CF_3)_3$ may be used. As the lithium salt, one lithium salt selected from these may be used alone. Alternatively, a mixture of two or more kinds of the lithium salts selected from these may be used as the lithium salt.

At least one of the positive electrode 201, the electrolyte layer 202, and the negative electrode 203 may include a non-aqueous electrolyte solution, a gel electrolyte, or an ionic liquid for the purpose of facilitating exchange of lithium ions and improving the output characteristic of the battery.

The non-aqueous electrolyte solution includes a non-aqueous solvent and a lithium salt dissolved in the non-aqueous solvent. As the non-aqueous solvent, a cyclic carbonate solvent, a chain carbonate solvent, a cyclic ether solvent, a chain ether solvent, a cyclic ester solvent, a chain ester solvent, or a fluorine solvent may be used. Examples of the cyclic carbonate solvent include ethylene carbonate, propylene carbonate, and butylene carbonate. Examples of the chain carbonate solvent include dimethyl carbonate, ethyl methyl carbonate, and diethyl carbonate. Examples of the cyclic ether solvent include tetrahydrofuran, 1,4-dioxane, and 1,3-dioxolane. Examples of the chain ether solvent include 1,2-dimethoxyethane and 1,2-diethoxyethane. Examples of the cyclic ester solvent include γ-butyrolactone. Examples of the chain ester solvent include methyl acetate. Examples of the fluorine solvent include fluoroethylene carbonate, methyl fluoropropionate, fluorobenzene, fluoroethyl methyl carbonate, and fluorodimethylene carbonate. As the non-aqueous solvent, one non-aqueous solvent selected from these may be used alone. Alternatively, a combination of two or more kinds of non-aqueous solvents selected from these may be used as the non-aqueous solvent. The non-aqueous electrolyte solution may include at least one fluorine solvent selected from the group consisting of fluoroethylene carbonate, methyl fluoropropionate, fluorobenzene, fluoroethyl methyl carbonate, and fluorodimethylene carbonate. As the lithium salt, $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, or $LiC(SO_2CF_3)_3$ may be used. As the lithium salt, one lithium salt selected from these may be used alone. Alternatively, a mixture of two or more kinds of lithium salts selected from these may be used as the lithium salt. The concentration of the lithium salt is, for example, within a range of 0.5 to 2 mol/liter.

As the gel electrolyte, a polymer material including the non-aqueous electrolyte solution may be used. As the polymer material, polyethylene oxide, polyacrylonitrile, polyvinylidene fluoride, polymethyl methacrylate, or a polymer having an ethylene oxide bond may be used.

The cation forming the ionic liquid may be:

an aliphatic chain quaternary salt such as tetraalkylammonium or tetraalkylphosphonium, aliphatic cyclic ammonium such as pyrrolidinium, morpholinium, imidazolinium, tetrahydropyrimidinium, piperazinium, or piperidinium; or a nitrogen-containing heterocyclic aromatic cation such as pyridinium or imidazolium.

An anion forming the ionic liquid is $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, or $C(SO_2CF_3)_3^-$. The ionic liquid may include a lithium salt.

At least one of the positive electrode 201, the electrolyte layer 202, and the negative electrode 203 may include a binder for the purpose of improving the adhesion between the particles. The binder is used to improve the binding property of the material forming the electrode. Examples of the binder include polyvinylidene fluoride, polytetrafluoroethylene, polyethylene, polypropylene, aramid resin, polyamide, polyimide, polyamideimide, polyacrylonitrile, polyacrylic acid, methyl polyacrylate ester, ethyl polyacrylate ester, hexyl polyacrylate ester, polymethacrylic acid, methyl polymethacrylate ester, ethyl polymethacrylate ester, hexyl polymethacrylate ester, polyvinyl acetate, polyvinylpyrrolidone, polyether, polyethersulfone, hexafluoropolypropylene, styrene butadiene rubber, and carboxymethylcellulose. As the binder, a copolymer of two or more kinds of materials selected from tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene may be used. In addition, two or more kinds of selected from these may be mixed and used as the binder.

In addition, at least one of the positive electrode 201 and the negative electrode 203 may include a conductive agent as necessary.

The conductive agent is used to reduce electrode resistance. Examples of the conductive agent include graphite such as natural graphite or artificial graphite; carbon black such as acetylene black or ketjen black; a conductive fiber such as a carbon fiber or a metal fiber; carbon fluoride; metal powder such as aluminum; conductive whiskers such as zinc oxide or potassium titanate; a conductive metal oxide such as titanium oxide; or a conductive polymer compound such as polyaniline, polypyrrole, or polythiophene. Cost reduction can be achieved by using such a carbon conductive agent as the conductive agent.

An example of the shape of the battery in the second embodiment is a coin, a cylinder, a prism, a sheet, a button, a flat type, or a stacking structure.

EXAMPLES

Hereinafter, details of the present disclosure will be described with reference to inventive examples and comparative example.

Inventive Example 1

[Production of Solid Electrolyte Material]

In an argon atmosphere having a dew point of −60° C. or less, raw material powders LiCl, $YCl_3$, and $BiCl_3$ were prepared at a molar ratio of $LiCl:YCl_3:BiCl_3=3:0.95:0.05$. These were ground and mixed in a mortar. Subsequently, milling processing was performed at 600 rpm for 25 hours using a planetary ball mill.

In this way, a powder of the solid electrolyte material of the inventive example 1 represented by the composition formula of $Li_3Y_{0.95}Bi_{0.05}Cl_6$ was provided.

[Evaluation of Lithium Ion Conductivity]

Figure 2:
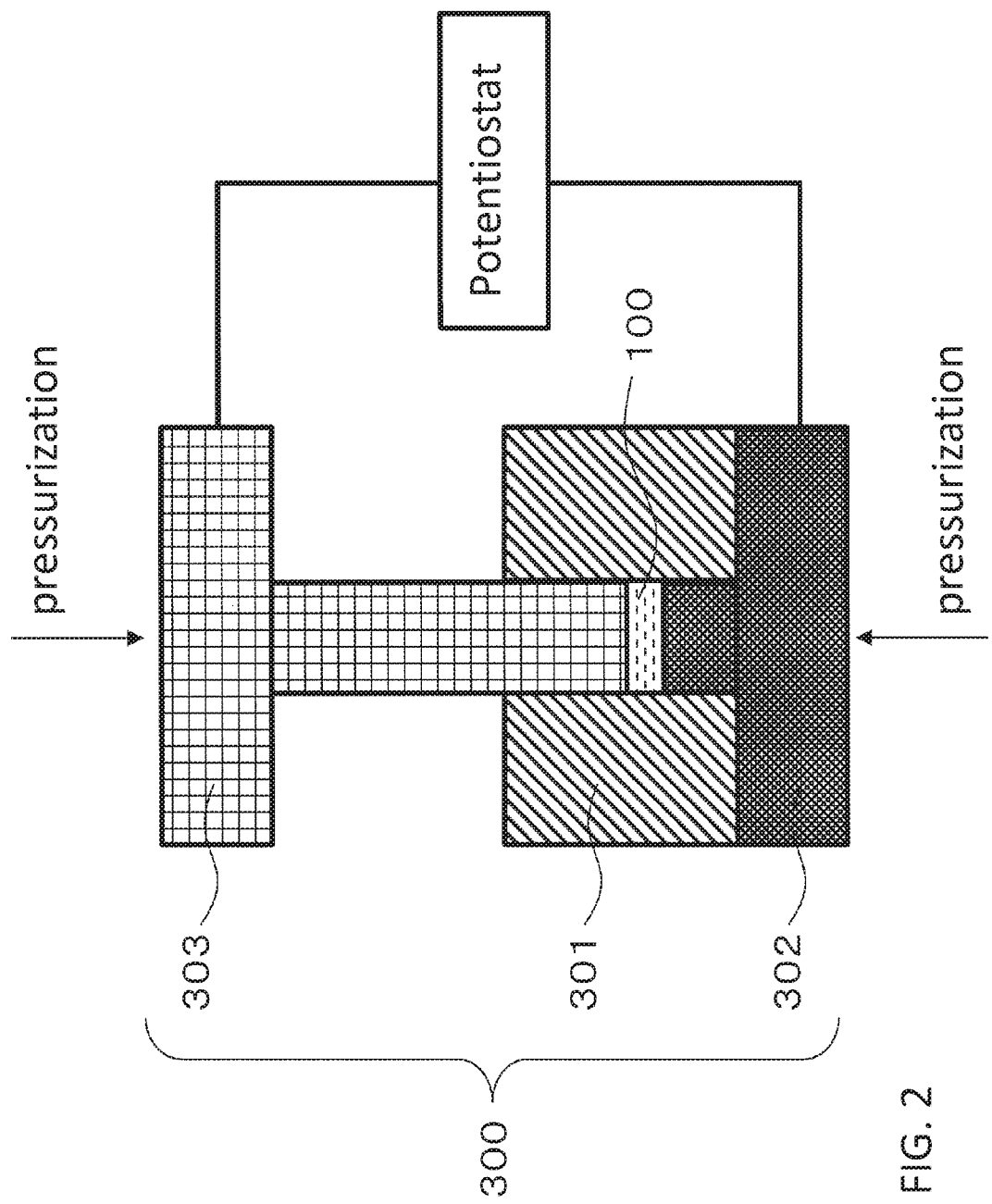
FIG. 2 is a schematic diagram showing a method for evaluating ion conductivity.

FIG. 2 is a schematic diagram showing a method for evaluating ion conductivity.

A pressure-molding die 300 is composed of a frame 301 formed of an electronically insulating polycarbonate, an upper punch part 303 and a lower punch part 302, both of which are formed of electron conductive stainless steel.

Using the configuration shown in FIG. 2, the ion conductivity was evaluated by the following method.

In a dry atmosphere with a dew point of −30° C. or lower, the inside of the pressure-molding die 300 was filled with the powder of the solid electrolyte material of the inventive example 1, and uniaxially pressed at 400 MPa to produce a conductivity measurement cell of the inventive example 1.

In the pressurized state, lead wires were routed from the upper punch part 303 and the lower punch part 302, connected to a potentiostat (Princeton Applied Research, VersaSTAT4) equipped with a frequency response analyzer. The ion conductivity at room temperature was measured by an electrochemical impedance measurement method.

Figure 3:
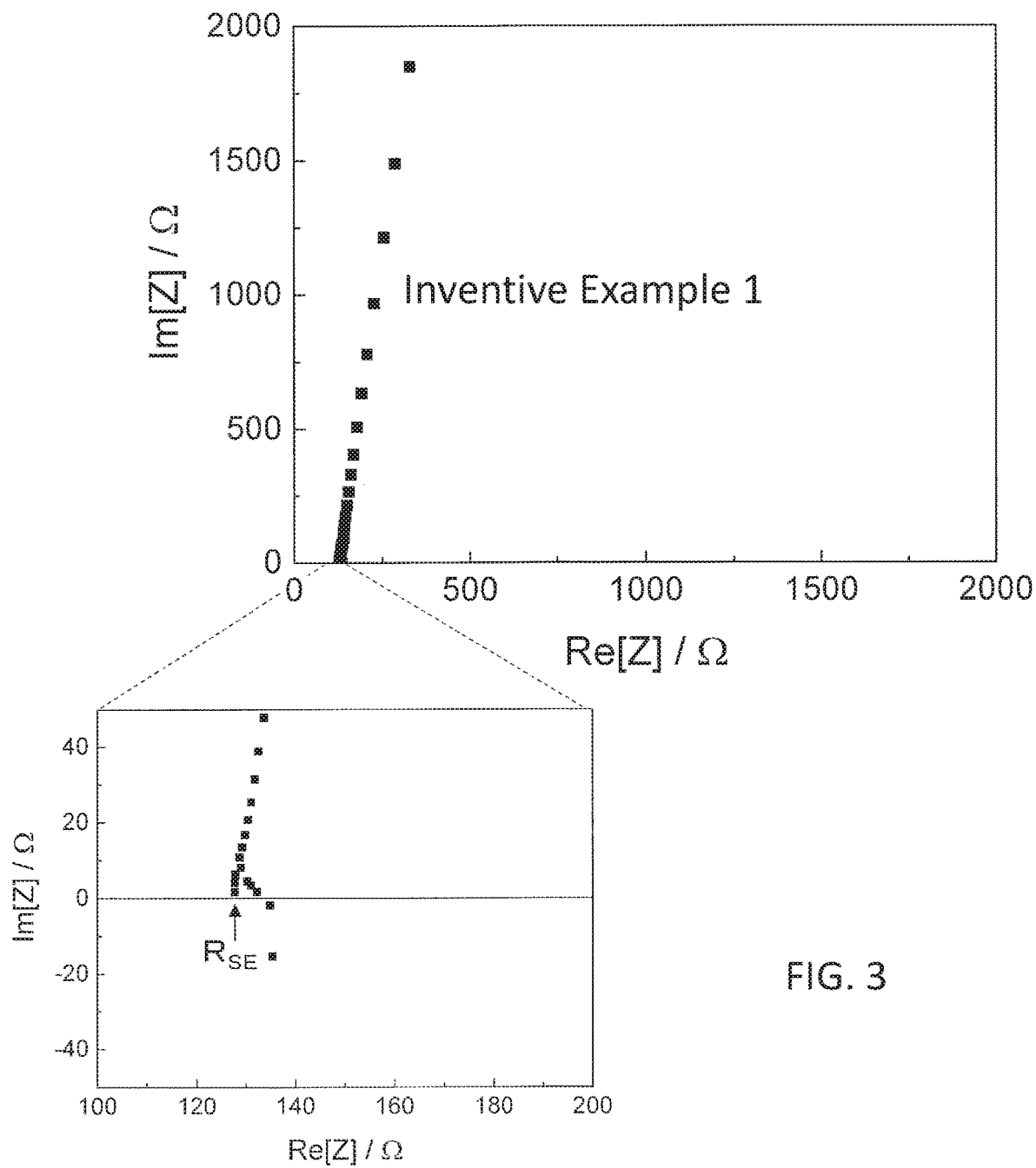
FIG. 3 is a graph showing an evaluation result of the ion conductivity by an AC impedance measurement.

FIG. 3 shows a Cole-Cole diagram of the results of the impedance measurement.

In FIG. 3, a real value of the impedance at the measurement point (arrow in FIG. 3) having the smallest absolute value of the phase of the complex impedance was deemed to be the resistance value for the ionic conduction of the solid electrolyte of the inventive example 1.

The ion conductivity was calculated from the following formula (2) using the resistance value of the electrolyte.

$$\sigma = (R_{SE} \times S/t)^{-1} \quad (2)$$

where σ is ion conductivity, S is an electrolyte area (inner diameter of the frame 301 in FIG. 2), R is the resistance value of the solid electrolyte in the above-mentioned impedance measurement, and t is a thickness of the electrolyte (in FIG. 2, the thickness of the compressed body of the plurality of the solid electrolyte particles 100).

The ion conductivity of the solid electrolyte material of the inventive example 1 measured at 22° C. was $6.3 \times 10^{-4}$ S/cm.

[Production of Secondary Battery]

In the argon glove box, the solid electrolyte material of the inventive example 1 and $LiCoO_2$ (hereinafter, referred to as LCO), which was an active material, were prepared at a volume ratio of 70:30. These were mixed in an agate mortar to prepare a mixture.

In an insulating outer cylinder, the solid electrolyte material of the inventive example 1 corresponding to 700 μm thickness, 8.54 mg of the above mixture, and 14.7 mg of Al powder were stacked in this order. This was pressure-molded at a pressure of 300 MPa to provide a first electrode and a solid electrolyte layer.

Next, a metal In (thickness: 200 μm) was stacked on the surface of the solid electrolyte layer opposite to the other surface which was in contact with the first electrode. This was pressure-molded at a pressure of 80 MPa to produce a stacking structure composed of the first electrode, the solid electrolyte layer, and a second electrode.

Next, stainless steel current collectors were placed on the upper and lower parts of the stacking structure, and current collector leads were attached to the current collectors.

Finally, an insulating ferrule was used to block and seal the inside of the insulating outer cylinder from the outside atmosphere.

In this way, the secondary battery of the inventive example 1 was produced.

[Charge/Discharge Test]

Figure 4:
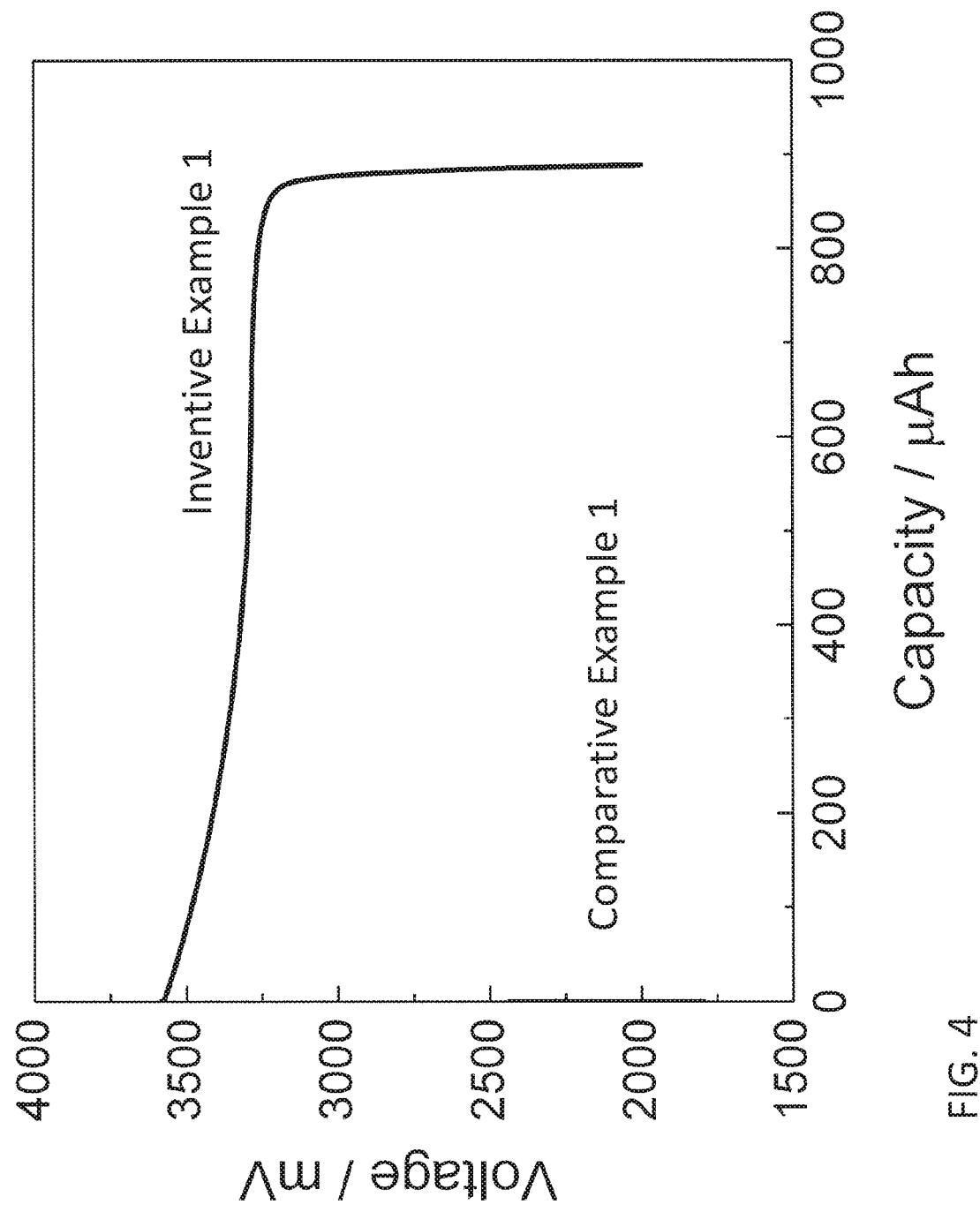
FIG. 4 is a graph showing an initial discharge characteristic.

FIG. 4 is a graph showing an initial discharge characteristic.

The results shown in FIG. 4 were measured by the following method.

In other words, the secondary battery of the inventive example 1 was placed in a thermostatic chamber at 25° C.

The battery was constant-current charged at a current value of 0.05 C rate (20 hour rate) with respect to the theoretical capacity of the battery, and the charge was terminated at a voltage of 3.6 V.

Next, the battery was discharged at a current value of 0.05 C rate, and the discharge was terminated at a voltage of 2.0 V.

As a result of the above measurement, the initial discharge capacity of the secondary battery of the inventive example 1 was 888 μAh.

Inventive Examples 2 to 22

Hereinafter, the synthesis and evaluation methods of $Li_{3-3\delta}Y_{1+\delta-a}M_aCl_{6-x-y}Br_xI_y$ will be described.

[Production of Solid Electrolyte Material]

In the inventive examples 2 to 22, raw material powders were prepared in a glove box maintained in a dry/low oxygen atmosphere having a dew point of −90° C. or less and an oxygen value of 5 ppm or less.

In the inventive examples 2 to 17, raw material powders LiCl, $YCl_3$, and $MCl_3$ were prepared at a molar ratio of $LiCl:YCl_3:MCl_3=(3-3\delta):(1+\delta-a):a$.

In the inventive example 18, raw material powders LiBr, $YBr_3$, and $MBr_3$ were prepared at a molar ratio of $LiBr:YBr_3:MBr_3=(3-3\delta):(1+\delta-a):a$.

In the inventive examples 19 and 20, raw material powders LiCl, $YBr_3$, and $MBr_3$ were prepared at a molar ratio of $LiCl:YBr_3:MBr_3=3:(1-a):a$.

In the inventive example 21, raw material powders LiI, $YBr_3$, and $MBr_3$ were prepared at a molar ratio of $LiI:YBr_3:MBr_3=3:0.95:0.05$.

In the inventive example 22, raw material powders LiI, LiBr, $YCl_3$, $YBr_3$, and $MBr_3$ were prepared at a molar ratio of $LiI:LiBr:YCl_3:YBr_3:MBr_3=2:1:0.6667:0.2833:0.05$.

The values of "δ" and "a" and the element of "M" in each of the inventive examples 2 to 22 are shown in Table 1.

The solid electrolyte materials of the inventive examples 2 to 22 were produced in the same manner as in the inventive example 1.

[Evaluation of Lithium Ion Conductivity]

In a glove box maintained in a dry/low oxygen atmosphere with a dew point of −90° C. or less and an oxygen value of 5 ppm or less, each conductivity measurement cell of the inventive examples 2 to 22 was provided in the same manner as in the inventive example 1.

Except for this, ion conductivity was measured in the same manner as in the inventive example 1.

The ion conductivity in each of the inventive examples 2 to 22 is shown in the following Table 1.

[Production of Secondary Battery]

In a glove box maintained in a dry/low oxygen atmosphere with a dew point of −90° C. or less and an oxygen value of 5 ppm or less, each solid electrolyte material of the inventive examples 2 to 22 and $LiCoO_2$, which was a positive electrode active material, were prepared at a volume ratio of 30:70. These were mixed in an agate mortar to produce a positive electrode mixture of each of the inventive examples 2 to 22.

Except for these, the secondary batteries of the inventive examples 2 to 22 were produced in the same manner as in the inventive example 1.

[Charge/Discharge Test]

A charge/discharge test of each of the secondary batteries of the inventive examples 2 to 22 was performed in the same manner as in the inventive example 1.

The initial discharge characteristic of each of the inventive examples 2 to 22 was similar to that of the inventive example 1, and a good charge/discharge characteristic was provided.

Comparative Example 1

LiCl and $FeCl_2$ were used as raw material powders for a solid electrolyte, and mixed at a molar ratio of $LiCl:FeCl_2=2:1$.

Except for this, the synthesis, the evaluation and the analysis were performed in the same manner as in the inventive example 1.

The ion conductivity measured at 22° C. was $9 \times 10^{-6}$ S/cm.

In addition, the solid electrolyte material of the inventive example 2 was used as a solid electrolyte used for the mixture and the solid electrolyte layer.

Except for this, a secondary battery was produced and a charge/discharge test was conducted in the same manner as in the inventive example 1.

The initial discharge capacity of the secondary battery of the inventive example was not more than 1 μAh, and the charge/discharge operation failed to be observed.

Table 1 shows each configuration and each evaluation result in the inventive examples 1 to 22 and the comparative example 1.

for M=Al, if $0.01 \leq a \leq 0.99$ is satisfied for M=Sc, or if $0.01 \leq a \leq 0.1$ is satisfied for M=Ga, higher ion conductivity is exhibited.

Further, if the value of δ, which indicates an amount of Li deficiency from the stoichiometric ratio thereof, is $-0.5 \leq \delta \leq 0.5$, higher ion conductivity is exhibited. As is clear from the inventive examples 4 to 7, if the value of δ is within the range of $-0.3 \leq \delta \leq 0.2$, higher ion conductivity is exhibited.

TABLE 1

|  | Composition | Anion | δ | a | M | Conductivity (S/m) |
|---|---|---|---|---|---|---|
| Inventive Example 1 | $Li_3Y_{0.95}Bi_{0.05}Cl_6$ | Cl | 0 | 0.05 | Bi | 6.3E−04 |
| Inventive Example 2 | $Li_3Y_{0.9}Bi_{0.1}Cl_6$ | Cl | 0 | 0.1 | Bi | 6.0E−04 |
| Inventive Example 3 | $Li_3Y_{0.5}Bi_{0.5}Cl_6$ | Cl | 0 | 0.5 | Bi | 1.1E−04 |
| Inventive Example 4 | $Li_{4.5}Y_{0.475}Bi_{0.025}Cl_6$ | Cl | −0.5 | 0.025 | Bi | 6.4E−05 |
| Inventive Example 5 | $Li_{3.9}Y_{0.665}Bi_{0.035}Cl_6$ | Cl | −0.3 | 0.035 | Bi | 1.8E−04 |
| Inventive Example 6 | $Li_{2.4}Y_{1.14}Bi_{0.06}Cl_6$ | Cl | 0.2 | 0.06 | Bi | 5.5E−04 |
| Inventive Example 7 | $Li_{1.5}Y_{1.425}Bi_{0.075}Cl_6$ | Cl | 0.5 | 0.075 | Bi | 6.7E−05 |
| Inventive Example 8 | $Li_3Y_{0.9}Al_{0.1}Cl_6$ | Cl | 0 | 0.1 | Al | 4.53E−04 |
| Inventive Example 9 | $Li_3Y_{0.8}Al_{0.2}Cl_6$ | Cl | 0 | 0.2 | Al | 6.7E−05 |
| Inventive Example 10 | $Li_3Y_{0.7}Al_{0.3}Cl_6$ | Cl | 0 | 0.3 | Al | 1.7E−05 |
| Inventive Example 11 | $Li_3Y_{0.95}Sc_{0.05}Cl_6$ | Cl | 0 | 0.05 | Sc | 6.3E−04 |
| Inventive Example 12 | $Li_3Y_{0.9}Sc_{0.1}Cl_6$ | Cl | 0 | 0.1 | Sc | 5.9E−04 |
| Inventive Example 13 | $Li_3Y_{0.7}Sc_{0.3}Cl_6$ | Cl | 0 | 0.3 | Sc | 4.0E−04 |
| Inventive Example 14 | $Li_3Y_{0.5}Sc_{0.5}Cl_6$ | Cl | 0 | 0.5 | Sc | 3.3E−04 |
| Inventive Example 15 | $Li_3Y_{0.01}Sc_{0.99}Cl_6$ | Cl | 0 | 0.99 | Sc | 1.9E−04 |
| Inventive Example 16 | $Li_3Y_{0.95}Ga_{0.05}Cl_6$ | Cl | 0 | 0.05 | Ga | 3.6E−04 |
| Inventive Example 17 | $Li_3Y_{0.9}Ga_{0.1}Cl_6$ | Cl | 0 | 0.1 | Ga | 3.8E−04 |
| Inventive Example 18 | $Li_3Y_{0.95}Bi_{0.05}Br_6$ | Br | 0 | 0.05 | Bi | 6.2E−04 |
| Inventive Example 19 | $Li_3Y_{0.5}Sc_{0.5}Cl_3Br_3$ | Cl, Br | 0 | 0.5 | Sc | 3.4E−04 |
| Inventive Example 20 | $Li_3Y_{0.95}Bi_{0.05}Cl_3Br_3$ | Cl, Br | 0 | 0.05 | Bi | 1.3E−03 |
| Inventive Example 21 | $Li_3Y_{0.95}Bi_{0.05}Br_3I_3$ | Br, I | 0 | 0.05 | Bi | 6.7E−04 |
| Inventive Example 22 | $Li_3Y_{0.95}Bi_{0.05}Cl_2Br_2I_2$ | Cl, Br, I | 0 | 0.05 | Bi | 3.0E−03 |
| Comparative Example 1 | $Li_2FeCl_4$ | Cl |  |  |  | 9E−06 |

Discussion

It can be seen that the inventive examples 1 to 22 show higher ion conductivity of not less than $1 \times 10^{-5}$ S/cm in the vicinity of room temperature, as compared to the comparative example 1.

In particular, if a value of a substitution amount a of M defined by the formula (1) is within the range of $0.01 \leq a \leq 0.99$, higher ion conductivity is exhibited. As is clear from the inventive examples 1 to 3 and 8 to 17, if $0.01 \leq a \leq 0.5$ is satisfied for M=Bi, if $0.01 \leq a \leq 0.1$ is satisfied In each of the inventive examples 1 to 22, the battery charge/discharge operation was performed at room temperature. On the other hand, in the comparative example 1, the discharge capacity was hardly provided, and the battery operation failed to be observed. Furthermore, since the materials of the inventive examples 1 to 22 do not include sulfur as a constituent element, hydrogen sulfide is not generated.

From the above, it is shown that the solid electrolyte material according to the present disclosure is an electrolyte material that does not generate hydrogen sulfide, exhibits high lithium ion conductivity, and can perform a good charge/discharge operation.

INDUSTRIAL APPLICABILITY

The battery of the present disclosure can be used as, for example, an all solid lithium secondary battery.

REFERENTIAL SIGNS LIST

100 Solid electrolyte particles
201 Positive electrode
202 Electrolyte layer
203 Negative electrode
204 Positive electrode active material particles
205 Negative electrode active material particles
300 Pressure-molding die
301 Frame
302 Lower punch part
303 Upper punch part
1000 Battery

The invention claimed is:

1. A solid electrolyte material represented by a composition formula $Li_{3-3\delta}Y_{1+\delta-a}M_aCl_{6-x-y}Br_xI_y$,
    where
    M is at least one element selected from the group consisting of Al, Sc, Ga, and Bi;
    $-1<\delta<1$;
    $0<a<2$;
    $0<(1+\delta-a)$;
    $0\le x\le 6$;
    $0\le y\le 6$; and
    $(x+y)<6$, and
    wherein an ion conductivity of the solid electrolyte material is not less than $1\times10^{-5}$ S/cm and not more than $3.0\times10^{-3}$ S/cm at room temperature.

2. The solid electrolyte material according to claim 1, wherein
    $0.025\le a\le 0.99$ is satisfied.

3. The solid electrolyte material according to claim 2, wherein
    $0.035\le a\le 0.1$ is satisfied.

4. The solid electrolyte material according to claim 1, wherein
    $-0.5\le\delta\le 0.5$ is satisfied.

5. The solid electrolyte material according to claim 4, wherein
    $-0.3\le\delta\le 0.2$ is satisfied.

6. A battery, comprising:
    the solid electrolyte material according to claim 1;
    a positive electrode;
    a negative electrode; and
    an electrolyte layer provided between the positive electrode and the negative electrode,
    wherein
    at least one selected from the group consisting of the positive electrode, the negative electrode, and the electrolyte layer includes the solid electrolyte material.

7. The solid electrolyte material according to claim 1, wherein
    M is at least one element selected from the group consisting of Al, Ga, and Bi.

8. The solid electrolyte material according to claim 1, wherein
    $0<x\le 6$; and $0<y\le 6$.

9. A solid electrolyte material represented by a composition formula $Li_{3-3\delta}Y_{1+\delta-a}M_aCl_{6-x-y}Br_xI_y$,
    where
    M is at least one element selected from the group consisting of Al, Ga, and Bi;
    $-1<\delta<1$;
    $0<a<2$;
    $0<(1+\delta-a)$;
    $0\le x\le 6$;
    $0\le y\le 6$; and
    $(x+y)\le 6$.

10. The solid electrolyte material according to claim 9, wherein
    $0.025\le a\le 0.99$ is satisfied.

11. The solid electrolyte material according to claim 10, wherein
    $0.035\le a\le 0.1$ is satisfied.

12. The solid electrolyte material according to claim 9, wherein
    $-0.5\le\delta\le 0.5$ is satisfied.

13. The solid electrolyte material according to claim 12, wherein
    $-0.3\le\delta\le 0.2$ is satisfied.

14. A battery, comprising:
    the solid electrolyte material according to claim 9;
    a positive electrode;
    a negative electrode; and
    an electrolyte layer provided between the positive electrode and the negative electrode,
    wherein
    at least one selected from the group consisting of the positive electrode, the negative electrode, and the electrolyte layer includes the solid electrolyte material.

15. The solid electrolyte material according to claim 9, wherein
    $0<x\le 6$; and $0<y\le 6$.

* * * * *